Dec. 6, 1960   H. S. STINSON   2,962,832
ATTACHMENT FOR FISHHOOKS
Original Filed April 16, 1958

INVENTOR.
Harold S. Stinson

2,962,832
ATTACHMENT FOR FISHHOOKS

Harold S. Stinson, Town and Country, Mo.
(11777 Clayton Road, St. Louis 31, Mo.)

Original application Apr. 16, 1958, Ser. No. 728,938. Divided and this application Mar. 29, 1960, Ser. No. 18,443

4 Claims. (Cl. 43—44.6)

The principle object of the invention is to provide a fish-hook which will hold a live minnow, or other types of bait, securely in position adjacent the fish-hook and includes an improved type of clamp which is easy to operate, simple in construction, and cheap to manufacture.

Other objects and advantages reside in the details of construction of the invention which is designed for simplicity, economy, and efficiency.

This application is a division of a pending application, Serial No. 728,938, filed April 16, 1958.

I do not limit the invention to the embodiment shown as the mechanical method of achieving this novel result may be modified in many ways without deviating from the spirit of the invention or the scope of the claims.

Figure 1:
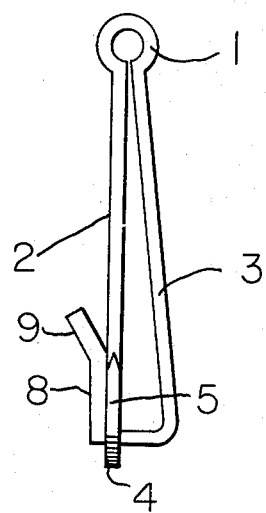

In the drawings Figure 1 is a side elevational view of the bait holding fish-hook, shown in normal position.

Figure 2:
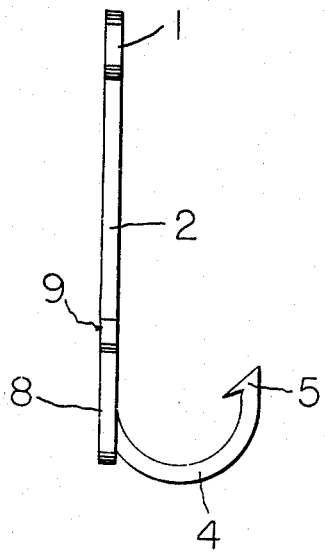

Figure 2 is a front elevational view of the invention.

The invention may be made of a single piece of spring-wire material which is bent between its extremities to form a circular loop 1 which forms the line-attaching end of the fish-hook. Extending from one of the extremities of said loop 1 is a shank 2 of an ordinary fish-hook, having a bend 4 and a burr 5. Extending from the other extremity of said loop 1 is the shank 3 of a bait clamping member 8. The shank 3 diverges at an angle inclining away from the shank 2 of the fish-hook. At a point, approximately, at the extremity of the shank 2 the shank 3 is bent inwardly under the bottom of the shank 2 and then extends upwardly on the opposite side of the shank 2 of the fish-hook. The portion of the clamping member designated 8 is normally in contacting engagement with the lower portion of the shank 2, and the upper extremity of the member 8 inclines away from the shank 2 of the fish-hook forming an inclined face 9.

In the operation of the invention, bait may be introduced into the device by pressing together the shanks 2 and 3 which will cause the clamping member 8 to separate from the lower portion of the fish-hook and permit the introduction of bait. Bait may also be introduced by wedging the bait between the inclined face 9 and the shank of the fish-hook 2.

It is to be understood that the foregoing description and the accompanying drawing is a simple diagrammatic illustration and example, and that changes and alternations in the present disclosure, which will be readily apparent to one skilled in the art, are contemplated as within the spirit of the present invention and the scope of the claims.

What I claim is:

1. In combination, a fish-hook having two diverging shanks lying in the same plane, their upper ends integrally connected by a resilient loop, their lower extremities positioned in opposition and spaced apart, so that they are free to be sprung together in said plane, a bend and burr of a fish-hook formed at the lower extremity of one of said shanks and projecting out of said plane, and a bait clamping element lying in the same plane as said shanks and formed at the lower extremity of the other shank and spaced therefrom a distance to receive a maximum size bait, said bait clamping element comprising a bait clamping member formed to resiliently engage and normally bear against the one shank, said bait clamping member and said other shank being positioned on opposite sides of said one shank, said bait clamping member having a bent lower extremity crossing under the lower end of said one shank and extending to and joining the lower extremity of the other shank, whereby bait of a size equal to or less than said maximum size may be inserted between said member and one shank to yieldingly spread the latter in said plane and clamp the bait therebetween.

2. In combination, a fish-hook having two diverging shanks lying in the same plane, their upper ends integrally connected by a resilient loop, their lower extremities positioned in opposition and spaced apart, so that they are free to be sprung together in said plane, a bend and burr of a fish-hook formed at the lower extremity of one of said shanks lying at right angles to the plane of said shanks, and a bait clamping element lying in the same plane as said shanks and formed at the lower extremity of the other shank and spaced therefrom a distance to receive a maximum size bait, said bait clamping element comprising a bait clamping member formed to resiliently engage and normally bear against the one shank, said bait clamping member and said other shank being positioned on opposite sides of said one shank, said bait clamping member having a bent lower extremity crossing under the lower end of said one shank and extending to and joining the lower extremity of the other shank, whereby bait of a size equal to or less than said maximum size may be inserted between said member and one shank to yieldingly spread the latter in said plane and clamp the bait therebetween.

3. In combination, a fish-hook having two diverging shanks lying in the same plane, their upper ends integrally connected by a resilient loop, their lower extremities positioned in opposition and spaced apart, so that they are free to be sprung together in said plane, a bend and burr of a fish-hook formed at the lower extremity of one of said shanks and projecting out of said plane, and a bait clamping element lying in the same plane as said shanks and formed at the lower extremity of the other shank and spaced therefrom a distance to receive a maximum size bait, said bait clamping element comprising a bait clamping member formed to resiliently engage and normally bear against the one shank, said bait clamping member and said other shank being positioned on opposite sides of said one shank, said bait clamping member having a bent lower extremity crossing under the lower end of said one shank and extending to and joining the lower extremity of the other shank, said bait clamping member having a bent upper extremity diverging outwardly from said one shank thereby forming an inwardly converging bait receiving opening whereby bait of a size equal to or less than said maximum size may be inserted in the opening thus provided then wedged between said member and one shank to yieldingly spread the latter in said plane and clamp the bait therebetween.

4. In combination, a fish-hook having two diverging shanks lying in the same plane, their upper ends integrally connected by a resilient loop, their lower extremities positioned in opposition and spaced apart, so that they are free to be sprung together in said plane, a bend and burr of a fish-hook formed at the lower extremity of one of said shanks lying at right angles to the plane of said shanks, and a bait clamping element lying in the same plane as said shanks and formed at the lower extremity of the other shank and spaced therefrom a distance to receive a maximum size bait, said bait clamping element comprising a bait clamping member formed to resiliently engage and normally bear against the one shank, said bait clamping member and said other shank being positioned on opposite sides of said one shank, said bait clamping member having a bent lower extremity crossing under the lower end of said one shank and extending to and joining the lower extremity of the other shank, said bait clamping member having a bent upper extremity diverging outwardly from said one shank thereby forming an inwardly converging bait receiving opening whereby bait of a size equal to or less than said maximum size may be inserted in the opening thus provided and then wedged between said member and one shank to yieldingly spread the latter in said plane and clamp the bait therebetween.

References Cited in the file of this patent

UNITED STATES PATENTS

| | | |
|---|---|---|
| 821,544 | Scott | May 22, 1906 |
| 2,215,613 | Hathaway | Sept. 24, 1940 |